United States Patent
Bhoj et al.

(10) Patent No.: US 7,197,564 B1
(45) Date of Patent: Mar. 27, 2007

(54) ADAPTIVE ADMISSION CONTROL SYSTEM FOR A SERVER APPLICATION SYSTEM

(75) Inventors: Preeti N. Bhoj, Cupertino, CA (US); Srinivas Ramanathan, Chennai (IN); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/545,394

(22) Filed: Apr. 7, 2000

(51) Int. Cl.
*G06F 15/173* (2006.01)

(52) U.S. Cl. ........................... 709/225; 709/226
(58) Field of Classification Search ........... 709/235, 709/237, 208–210, 226, 225
See application file for complete search history.

(56) References Cited

U.S. PATENT DOCUMENTS

| | | | | |
|---|---|---|---|---|
| 3,623,006 A | * | 11/1971 | Balakian et al. | 711/111 |
| 5,265,252 A | * | 11/1993 | Rawson et al. | 709/326 |
| 5,805,577 A | * | 9/1998 | Jain et al. | 370/234 |
| 5,878,224 A | * | 3/1999 | Smith | 709/224 |
| 5,936,940 A | * | 8/1999 | Marin et al. | 370/232 |
| 5,938,749 A | * | 8/1999 | Rusu et al. | 710/54 |
| 6,125,397 A | * | 9/2000 | Yoshimura et al. | 709/235 |
| 6,215,791 B1 | * | 4/2001 | Kim | 370/412 |
| 6,314,463 B1 | * | 11/2001 | Abbott et al. | 709/224 |
| 6,323,881 B1 | * | 11/2001 | Broulik et al. | 345/744 |
| 6,434,631 B1 | * | 8/2002 | Bruno et al. | 710/6 |
| 6,487,212 B1 | * | 11/2002 | Erimli et al. | 370/413 |
| 6,542,950 B1 | * | 4/2003 | Bodnar | 710/260 |

* cited by examiner

*Primary Examiner*—Larry D. Donaghue
(74) *Attorney, Agent, or Firm*—Richard P. Lange

(57) ABSTRACT

An adaptive admission control system for a server application system includes a request queue that stores incoming requests. A discard queue is provided to store requests to be discarded. An actuator is coupled to the request queue and the discard queue to determine the input rate of requests during a previous processing cycle. A controller is coupled to the actuator and the request queue to determine a target number of requests to be sent to the request queue during the next processing cycle based on the difference between the actual and desired queue occupancy of the request queue. The controller sends the target number to the actuator. The actuator sends the target number of requests to the request queue either from the listen queue or from the listen queue and the discard queue based on the input rate of requests from the listen queue.

18 Claims, 6 Drawing Sheets

ADAPTIVE ADMISSION CONTROL SYSTEM FOR A SERVER APPLICATION SYSTEM

BACKGROUND OF THE INVENTION

1. Field of the Invention

The present invention pertains to the Internet. More particularly, this invention relates to an adaptive admission control system for a server application system, wherein the adaptive admission control system is a queue-based admission control system.

2. Description of the Related Art

With the rapid growth of the Internet, more and more business and residential users are beginning to rely on the Internet for their mainstream and mission-critical activities. As is known, the Internet typically refers to a number of data service systems connected together via a high speed interconnect network (see FIG. 1 (PRIOR ART)). Each data service system typically includes Internet server applications that host content for various customers. The Internet server applications can also host applications. Remote user terminals (e.g., terminals 11a–11n in FIG. 1 (PRIOR ART)) may be connected to a data service system (e.g., the data service system 20 in FIG. 1 (PRIOR ART)) via an interconnect network. Each user terminal is equipped with a web browser (or other software such as an e-mail software) that allows the user terminal to access the contents and/or applications hosted in various data service systems.

Popular Internet applications include World Wide Web (WWW), E-mail, news, and FTP applications. All of these applications follow the client-server model and rely on the Transmission Control Protocol (TCP) for reliable delivery of information/applications between severs and user terminals. New connection requests received by a data service system (e.g., the system 20 in FIG. 2 (PRIOR ART)) are first processed by a TCP/IP stack which is part of the data service system's kernel (i.e., operating system). FIG. 2 (PRIOR ART) shows that the kernel 21 is external to the server application 25 that processes the new connection requests received. The TCP/IP stack in the kernel 21 holds the new connection requests in TCP listen queues, one queue-per port. The maximum number of requests that can be held in a listen queue is a configurable parameter. When a server application is ready to process a new request, the server application accepts a new request from its associated listen queue. At this time, the new request is removed from the listen queue.

Such a prior art scheme, however, bears a number of disadvantages. One disadvantage is the fixed length of the listen queue. It is very costly if the listen queue is made to store a very large number of requests. If the listen queue is made very small, the listen queue cannot hold many requests and will be full frequently.

The other disadvantage is that when the listen queue is full, new incoming requests cannot be stored in the listen queue and have to be discarded. This may cause significant inconvenience to a user who is in the middle of his/her web transaction. As we know, many web-based services are transactional in nature. To complete a transaction, the user has to issue several requests to the web server. For example, to use a banking service, a user may first access the bank's home page, sign on through the home page or a signing page, then go to the account balance page. The user may then go to various pages to perform various transactions such as pay off bills, transfer funds between different accounts. Finally, the user may sign off. As can be seen from above, during the entire user session, the user issued a number of requests. If one of the user requests is rejected or discarded, the user may have to start all over again (e.g., from signing on), unnecessarily increasing traffic through the Internet.

To try to solve the problems, a prior art session-based admission control is proposed which performs admission control on incoming user sessions rather than on individual user requests. A session can be defined as a series of requests issued by a user within a predetermined time period (e.g., thirty minutes). In a session-based admission control arrangement, when the server application reaches its overload condition, the server application only allows requests for existing sessions to be serviced while rejecting requests for new sessions (or redirecting these requests to other server applications).

This prior art proposal still bears many disadvantages. One disadvantage is that the prior art proposal still cannot overcome the problem that the listen queue has a fixed queue length. The other disadvantage is that the proposal is still reactive in the sense that requests are denied service only after certain thresholds are violated. Before any threshold violations occur, all requests (whether for existing sessions or for new sessions) are accepted for service. The prior art proposal cannot predict when threshold violations will occur.

SUMMARY OF THE INVENTION

One feature of the present invention is to improve performance of a server application.

Another feature of the present invention is to allow adaptive admission control of a server application.

A further feature of the present invention is to provide an adaptive queue-based admission control system for a server application.

An adaptive admission control system for a server application system includes a request queue that stores incoming requests before they are serviced by the server application. A discard queue is provided to store requests to be discarded. An actuator is coupled to the request queue, the discard queue, and an external listen queue to determine the input rate of requests from the listen queue during previous processing cycles. A controller is coupled to the actuator and the queue to determine a target number of requests to be sent to the request queue during the next processing cycle based on the difference between the actual and desired queue occupancy of the request queue. The controller sends the target number to the actuator. The actuator sends the target number of requests to be placed into the request queue either from the listen queue or from the listen queue and the discard queue based on the input rate of requests the listen queue.

If the input rate is greater than or equal to the target number, the actuator only sends the target number of requests from the listen queue to the request queue during the processing cycle. In this case, the actuator sends the remaining number of requests, if any, to the discard queue. If the input rate is less than the target number, then the actuator sends the target number of requests from both the listen queue and the discard queue to the request queue.

A server application system is also described. The server application system includes a server application module that performs predetermined server functions based on external requests from an external queue. The server application system also includes an adaptive admission control system that controls admission to the server application module. The adaptive admission control system further comprises a request queue that stores incoming requests before they are serviced by the server application, a discard queue that stores requests to be discarded, and an actuator coupled to the request queue, the discard queue, and an external listen queue to determine the input rate of requests from the listen queue during previous processing cycles. The actuator also sends a target number of requests to be placed into the request queue from the listen queue and the discard queue based on the input rate of requests from the listen queue. The adaptive admission control system also includes a controller coupled to the actuator and the request queue to determine the target number based on the difference between the actual and desired queue occupancy of the request queue.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
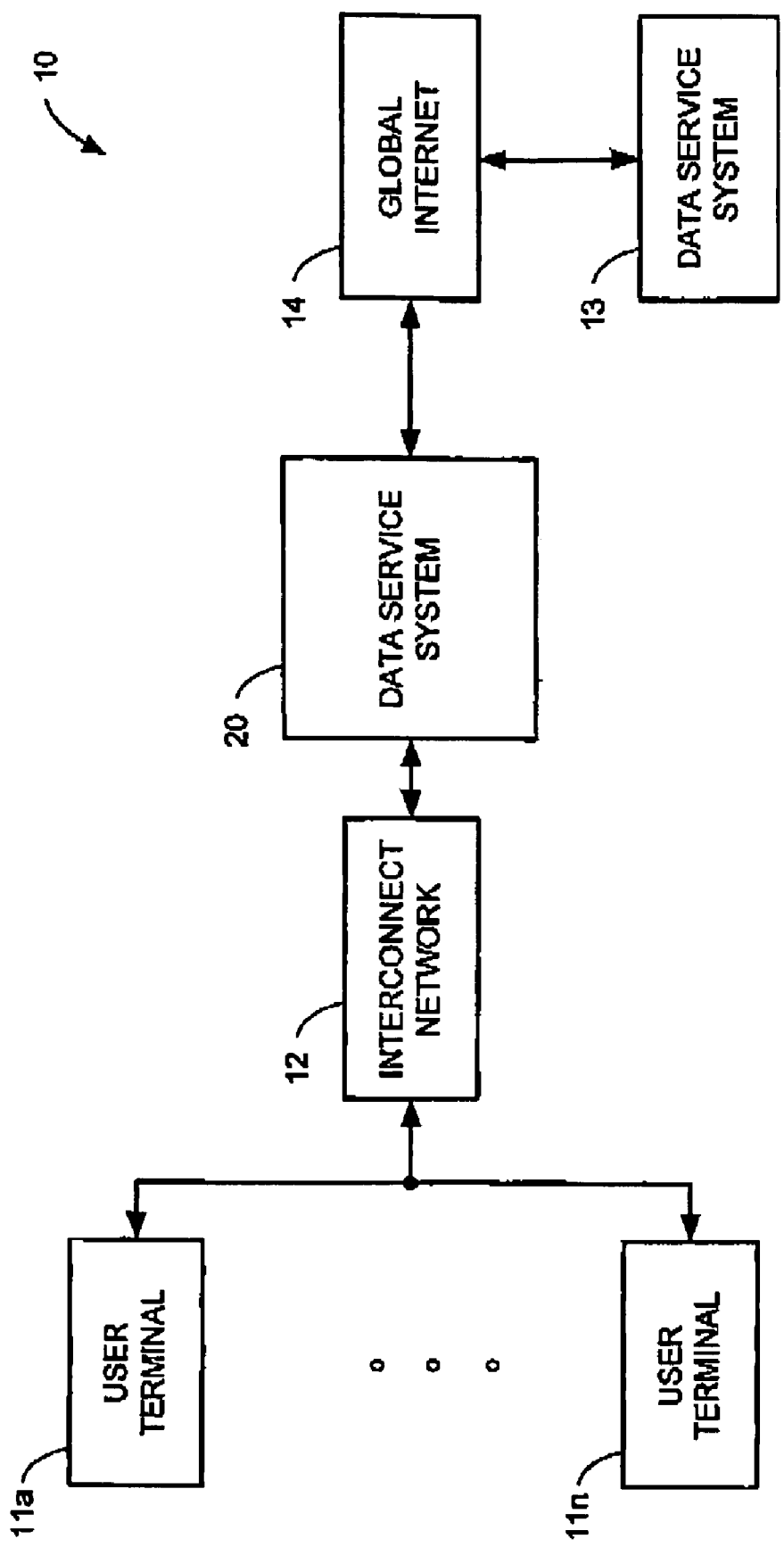
FIG. 1 (PRIOR ART) schematically shows the structure of the Internet.
Figure 2:
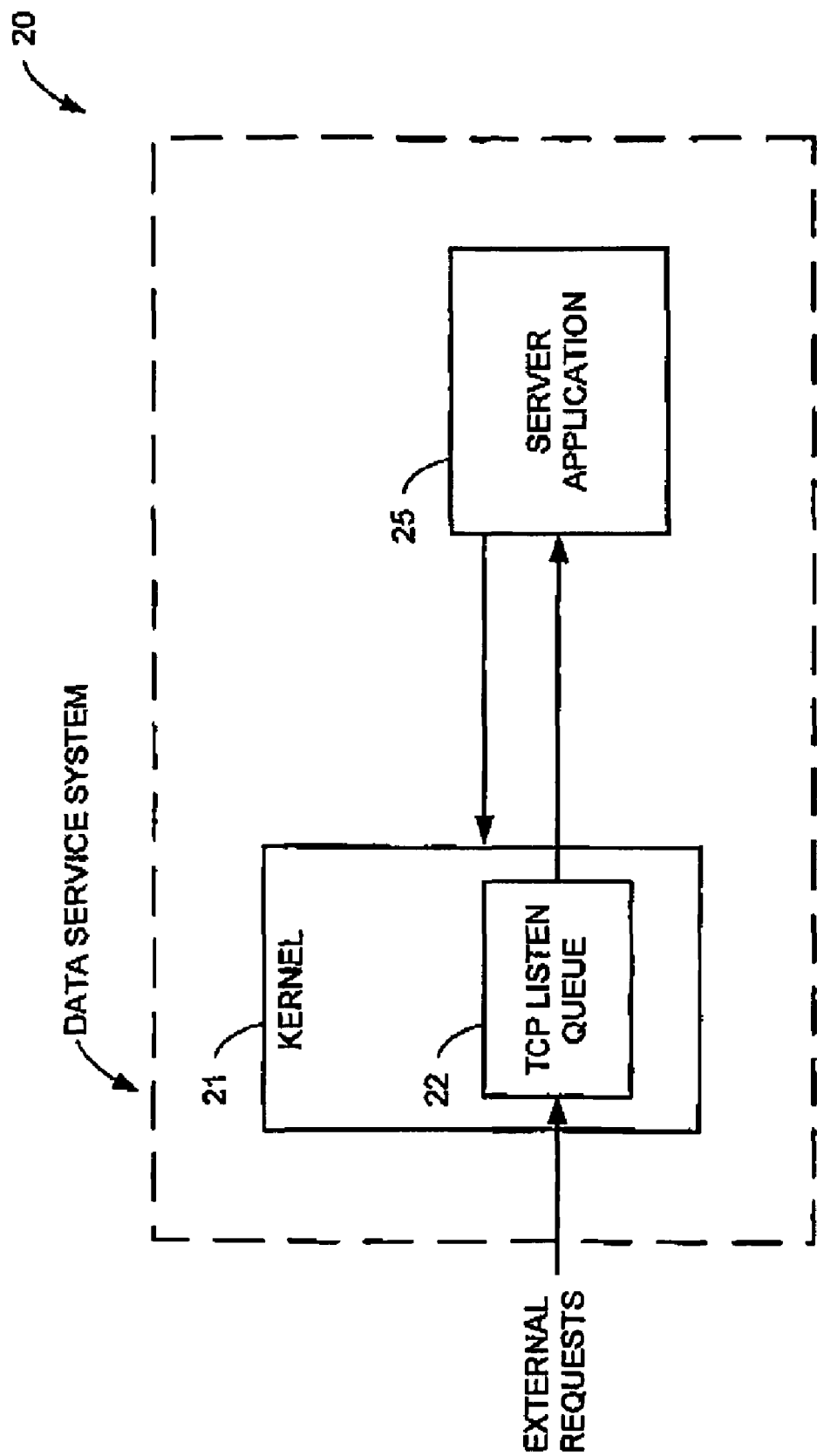
FIG. 2 (PRIOR ART) shows a prior art arrangement of the data service system employed in the Internet of FIG. 1 (PRIOR ART)
Figure 3:
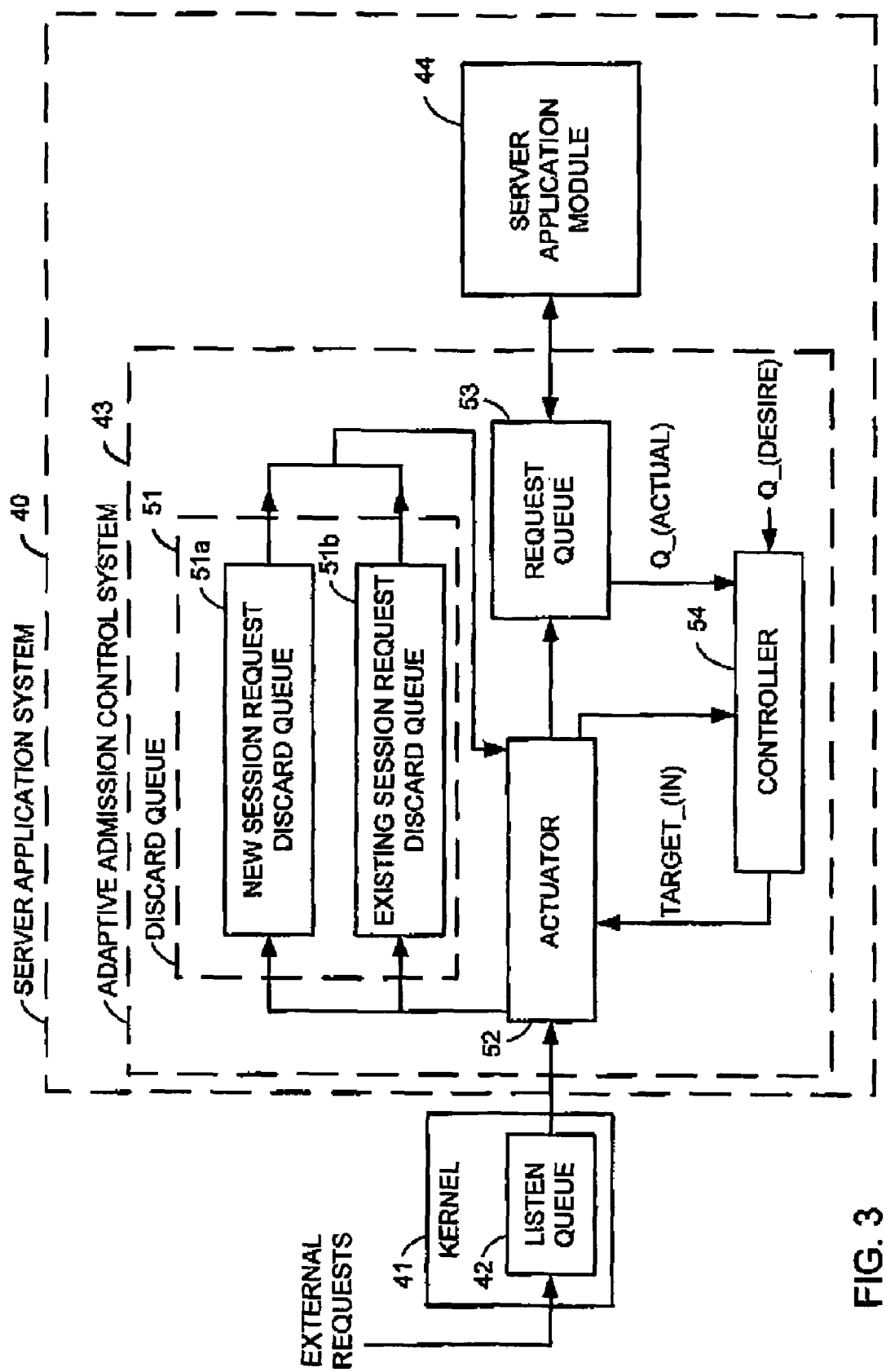
FIG. 3 shows the structure of a server application system having an adaptive admission control system in accordance with one embodiment of the present invention.

FIG. 3 shows a server application system 40 that includes an adaptive admission control system 43 and a server application module 44. The adaptive admission control system 43 implements one embodiment of the present invention.

As will be described in more detail below, the adaptive admission control system 43 includes a request queue 53 that stores incoming requests before they are fetched by the server application module 44 for services. A discard queue 51 is provided to store requests to be discarded. The discard queue 51 includes a new session request discard queue 51a and an existing session request discard queue 51b. An actuator 52 is coupled to the request queue 53, the discard queue 51, and a listen queue 42 that is external to the server application system 40. The actuator 52 determines the input rate of requests from the listen queue 42 during previous processing cycles of the adaptive admission control system 43. The admission control system 43 also includes a controller 54 that is coupled to the actuator 52 and the request queue 53 to determine a target number (i.e., Target_(in)) of requests to be sent to the request queue 53 during a processing cycle. The controller 54 determines the target number Target_(in) based on the difference between the actual and desired queue occupancy (i.e., Q_(actual) and Q_(desire)) of the request queue 53. The controller 54 sends the target number Target_(in) to the actuator 52.

During the next processing cycle, if the input rate of requests (i.e., the number of requests) from the listen queue 42 is greater than or equal to the target number Target_(in), the actuator 52 only sends the target number of requests from the listen queue 42 to the request queue 53. In this case, the actuator 53 sends the remaining number of requests, if any, to the discard queue 51. Which request is actually sent to the request queue 53 and which request is sent to the discard queue 51 is determined by the actuator 52 on random basis so long as the total number of the requests sent to the request queue 53 is equal to the target number Target_(in). When the actuator 52 decides to send a request to the request queue 53, the actuator 52 determines if the request is a new session request. If so, the actuator 52, instead of sending the request to the request queue 53, sends an existing session request from the discard queue 51 to the request queue 53 and sends the new session request to the discard queue 51.

If the input rate of the listen queue 42 is less than the target number Target_(in), the actuator 52 then sends the target number of requests from both the listen queue 42 and the discard queue 51 to the request queue 53. In this case, the actuator 52 first retrieves requests from the existing session queue 51b of the discard queue 51. The discard queue 51 is cleaned up after a predetermined number of processing cycles (e.g., every two or three cycles).

In summary, the key of the present invention is to dynamically control admission to the server application module 44 based on the estimated rate of the incoming requests to the listen queue 42 and the queue occupancy of the request queue 53. Thus, the system 43 is an adaptive queue-based admission control system for a server application. It offers predictive admission control policy for the server application module 44. This is due to the fact that the admission control system 43 uses past history to estimate the rate of new requests coming to the server application system 40 through the listen queue 42, and the rate at which the server application module 44 processes the requests during a processing cycle (reflected as the queue occupancy of the request queue 53). In this case, the admission control system 43 is able to predict the number of requests that can be admitted for services in that cycle. The use of estimates based on past history ensures that the server application system 40 could decide to deny service to requests even before any thresholds are violated. The structure and operation of the adaptive admission control system 43 will be described in more detail below, also in conjunction with FIGS. 3–4C.

Referring again to FIG. 3, the server application system 40 can be any kind of server application system. In one embedment, the server application system 50 is a TCP/IP-based server application system. This means that the server application module 44 is a TCP/IP-based server application. A TCP/IP-based server application is a connection-based server application. An example of such an application is a web content server, an e-mail server, a news server, an e-commerce server, a proxy server, a domain name server, and a local service server. This means that the server application system 40 can be any one of the above-mentioned server systems. Alternatively, the server application system 40 can be other type of server application system.

The server application system 40 can be implemented by or operate in a computer system or other data processing system with a network communication capability. The computer system that implements the server application system 40 can be server computer system, a workstation computer system, a personal computer system, or a mainframe computer system, a notebook computer system, or any other computer system.

The server application system 40 can be employed by an Internet Service Provider (ISP) to offer data services (e.g., web, news, advertisement, or e-mail) and other services (e.g., e-commerce) to users or subscribers connected to the server application system 40. Here, a customer means the entity contracting with the server application system 40 to have its content hosted in the server application system 40, or to have its services offered through the server application system 40. A user or subscriber means the entity accessing the server application system 40 through a remote user terminal via a communication network.

The server application module 44 performs the predetermined server function of the server application system 40. For example, if the server application system 40 is a web server, the server application module 44 performs the web server function which may include hosting web content and processing requests to retrieve their web pages. The server application module 44 is implemented using any known technology. The structure of the server application module 44 is also known and dependent on the type of server it implements. Thus, the structure of the server application module 44 will not to be described in more detail below.

The server application module 44 can be a static server or dynamic server. In one embodiment, the server application module 44 is a static server that stores static files only. In another embodiment, the server application module 44 may store both static and dynamic files. As is known, web content is generally classified as static, such as a file, or dynamic, such as cgi-scripts. Dynamic content may be generated at run-time by a back-end engine (e.g., an application server or a database engine) that is separate from the server itself.

The server application module 44 hosts content and/or applications that can be accessed by users external to the server application system 40. The server application module 44 can be of any kind of server that stores a number of content files. Each of the content files can be accessed by an access request. The server application module 44 may also include a number of content sites, each storing a number of content files for access by multiple access requests. The multiple content sites may belong to different content providers or customers. The sever application module 44 stores content files or dynamic executable code/program for access by requests. Thus, the content files hereinafter refer to (1) static content files, (2) dynamic content files, and (3) executable programs/codes.

The access to the server application module 44 may be done by a user at an external user terminal (not shown in FIG. 3) who generates and sends at least one request directed at the server application module 44. Alternatively, an access request may be generated by a server application system wanting to access the server application system 40.

Incoming requests to the server application module 44 are first received in the adaptive admission control system 43 from the external TCP listen queue 42 before they are sent to the server application module 44 for servicing. The external TCP listen queue 42 is within the kernel 41 of the operating system (not shown) of the computer system (also not shown) that runs the server application system 40. The external TCP listen queue 42 stores the incoming requests before they are processed by the server application system 40.

The server application module 44 can process multiple requests at the same time. However, the server application module 44 has limits on the number of requests it can process per second. The processing limits also depend on the processing power of the server application module 44.

When the number of requests received by the server application module 44 greatly exceeds the processing limits of the server application module 44, the server application module 44 will be in an overload condition, resulting in at least unbearably longer response time and poor performance of the server application module 44. In this case, the rate of incoming requests is greater than the rate at which the server application module 44 is processing requests. Consequently, the number of requests that are awaiting service (referred to as the request queue length) grows during overload. When the request rate increases beyond the server capacity, server performance deteriorates dramatically, potentially causing a service outage. In addition, when a user issues a request and does not get any response, the user is likely to issue several more subsequent requests. This quickly increases the number of requests received by the server application module 44.

To control admission to the server application module 44, the adaptive admission control system 43 uses the request queue length (i.e., queue occupancy of the request queue 53) as the metric on which admission control is based. The main reason for this choice is that irrespective of where the bottleneck is, whether it is the CPU, memory, the network, or the application server, an increase in the number of requests that are awaiting service is an indicator that the server application module 44 is overloaded. To control the degree of overload, admission control is necessary. A target value (i.e., Q_(desire)) for the request queue length is applied to the admission control system 43. The admission control system 43 ensures that the number of outstanding requests in its queue (i.e., the request queue 53) stays at or below this value. The target value is specified by the operator of the application system 40. There are interesting tradeoffs in choosing the target value. The smaller the target value, the smaller the queuing delay for requests, hence, the smaller the overall response time for a request. On the other hand, the smaller the target value, the greater the chance that a request may be denied service. Hence, in choosing the target value, an operator has to decide whether admission control must be optimized to ensure lowest response time, or to ensure the maximum capacity (in terms of requests or sessions serviced). The controller 54 of the system 43 can use any control techniques that are known to people skilled in the art. For example, it can be a standard proportional integral (PI) controller.

In addition, the adaptive admission control system 43 uses past history to estimate the rate of new requests coming to the server application system 40 through the listen queue 42. These two features together offer predictive admission control policy for the server application module 44. The adaptive admission control system 43 then dynamically controls admission to the server application module 44 based on the estimated rate of the incoming requests to the listen queue 42 and the queue occupancy of the request queue 53. This makes the adaptive admission control system 43 an adaptive queue-based admission control system for a server application. The use of estimates based on past history ensures that the server application system 40 could decide to deny service to requests even before any thresholds are violated. The structure of the admission control system 43 will be described in more detail below.

As can be seen from FIG. 3, the adaptive admission control system 43 includes the actuator 52 coupled to receive requests from the external listen queue 42. The actuator 52 is also connected to the discard queue 51. The discard queue 51 includes a new session request discard queue 51*a* and an existing session request discard queue 51*b*. The actuator 52 is also connected to the request queue 53. The request queue 53 is then connected to the external server application module 44. In addition, the adaptive admission control system 43 also includes a controller 54, which is connected to the actuator 52 and the request queue 53.

The request queue 53 stores the requests to be processed or serviced by the server application module 44. The request queue 53 has a predetermined queue length which determined by the operator of the system 40. The predetermined queue length of the request queue 53 determines the maximum number of requests stored in the request queue 53. The request queue 53 can be implemented using any known storage means.

In addition, the predetermined queue length of the request queue 53 also limits the desired queue occupancy Q_(desire) set by the operator of the server application system 40. This means that the desired queue occupancy Q_(desire) cannot be greater than the predetermined queue length. In one embodiment, the desired queue occupancy Q_(desire) is set to be some fraction (e.g., ⅔ or ⅘) of the predetermined queue length of the request queue 53.

The discard queue 51 stores "overflow" requests. The "overflow" requests are the requests that the actuator 52 has fetched from the external listen queue 42 during one processing cycle, but has decided not to send to the request queue 53. This may have resulted from the target number (i.e., Target_(in)) limitation imposed by the controller 54. Thus, these requests become excessive requests and are to be discarded. In the present invention, the actuator 52 does not discard these requests immediately. Instead, these "overflow" requests are stored in the discard queue 51 temporarily before they are discarded.

The discard queue 51 is divided into the new session request discard queue 51a and an existing session request discard queue 51b. The new session request discard queue 51a stores the new session requests that are to be discarded. The existing session request discard queue 51b stores the existing session requests that are to be discarded. Each of the discard queues 51a and 51b has a predetermined queue length. The output of each of the discard queues 51a–51b is connected to the actuator 52. Each of the discard queues 51a–51b is cleaned up periodically (e.g., after every two or three processing cycles) to discard the requests stored in them.

Because the input load to the server application system 40 can be irregular, requests that are denied admission by the actuator 52 during some processing cycles can be temporarily stored in the discard queue 51. This allows at least some of the "overflow" requests to be reconsidered by the actuator 52 before they are actually discarded. This is especially useful when, during some processing cycles, the incoming requests received from the external listen queue 42 by the actuator 52 are short of the target number Target_(in) specified by the controller 54. In those situations, the actuator 52 can fetch some requests from the discard queue 51 to send to the request queue 53.

The controller 54 receives the predetermined queue target value Q_(desire). The controller 54 also receives the actual queue occupancy value Q_(actual) from the request queue 53, and the actual number of requests sent from the actuator 52 to the request queue 53 during one processing cycle. The actual queue occupancy value Q_(actual) indicates the actual queue occupancy of the request queue 53. Based on these inputs, the controller 54 generates the target number Target_(in) that specifies the number of requests to be sent to the request queue 53 during the next processing cycle. The target number value Target_(in) is then fed to the actuator 52 to control the actuator 52 to send the target number of requests to the request queue 53. Which requests are actually sent to the request queue 53 is decided by the actuator 52. The target number Target_(in) only specifies the total number of requests to be sent to the request queue 53 during the next processing cycle. This means that the target number Target_(in) is dynamically changed during operation and may be different during different processing cycles.

To understand the operation of the controller 54 in determining the target number Target_(in), consider the operation of the application server system 40 during a processing cycle [t−T, t], wherein t represents the time at the end of the cycle, and T is the duration of the cycle. Suppose in(t) represents the number of requests that the actuator 52 receives during this cycle. Also, suppose out(t) is the number of requests that the server application module 44 processes during this cycle period. If Q_(actual)(t−T) represents the length of the request queue at time t−T, the queue length at time t is given by Q_(actual)(t)=Q_(actual)(t−T)+in(t)−out(t).

Then the current actual queue length of the request queue 53 is subtracted from the desired queue length of the request queue 53 (i.e., Q_(desire)). Assuming e(t) represents the difference (i.e., $Q_{13}$ (desire)−Q_(actual)(t)), the controller 54 then determines the value of the target number Target_(in) (t)(i.e., the number of requests that can be added to the request queue 53 during the next processing cycle [t, t+T]) based on the following equation:

$$Target\_(in)(t) = in(t) + A \times e(t) + B \times e(t-T)$$

where A and B are constants which are determined using techniques known to persons skilled in the art. Note that in determining Target_(in)(t), the controller 54 has made no assumptions about the rate of processing requests by the server application module 44. In fact, the controller 54 adapts its output based on the application server's processing rates from the previous interval. The above discussion assumes that the controller 54 is a proportional integral (PI) controller. Other known controllers can also be used to generate the Target_(in) value.

The actuator 52 is responsible for ensuring that no more than the target number Target_(in) of requests are admitted to the request queue 53 during each processing cycle. This means that the actuator 52 ensures that no more than Target_(in)(t) requests are added to the request queue 53 during the processing cycle [t, t+T]. Here, (t) means that the target number Target_(in) is not a constant number and may change along the time axis. In addition, the actuator 52 also determines which of the incoming requests are to be sent to the request queue 53 and which of the incoming requests are sent to the discard queue 51. If the number of incoming requests are fewer than the target number Target_(in), the actuator 52 also determines which requests stored in the discard queue 51 are to be taken from the discard queue 51 to the request queue 53. The operation of the actuator 52 is shown in FIGS. 4A through 4C, which will be described in more detail below.

Figure 4A:
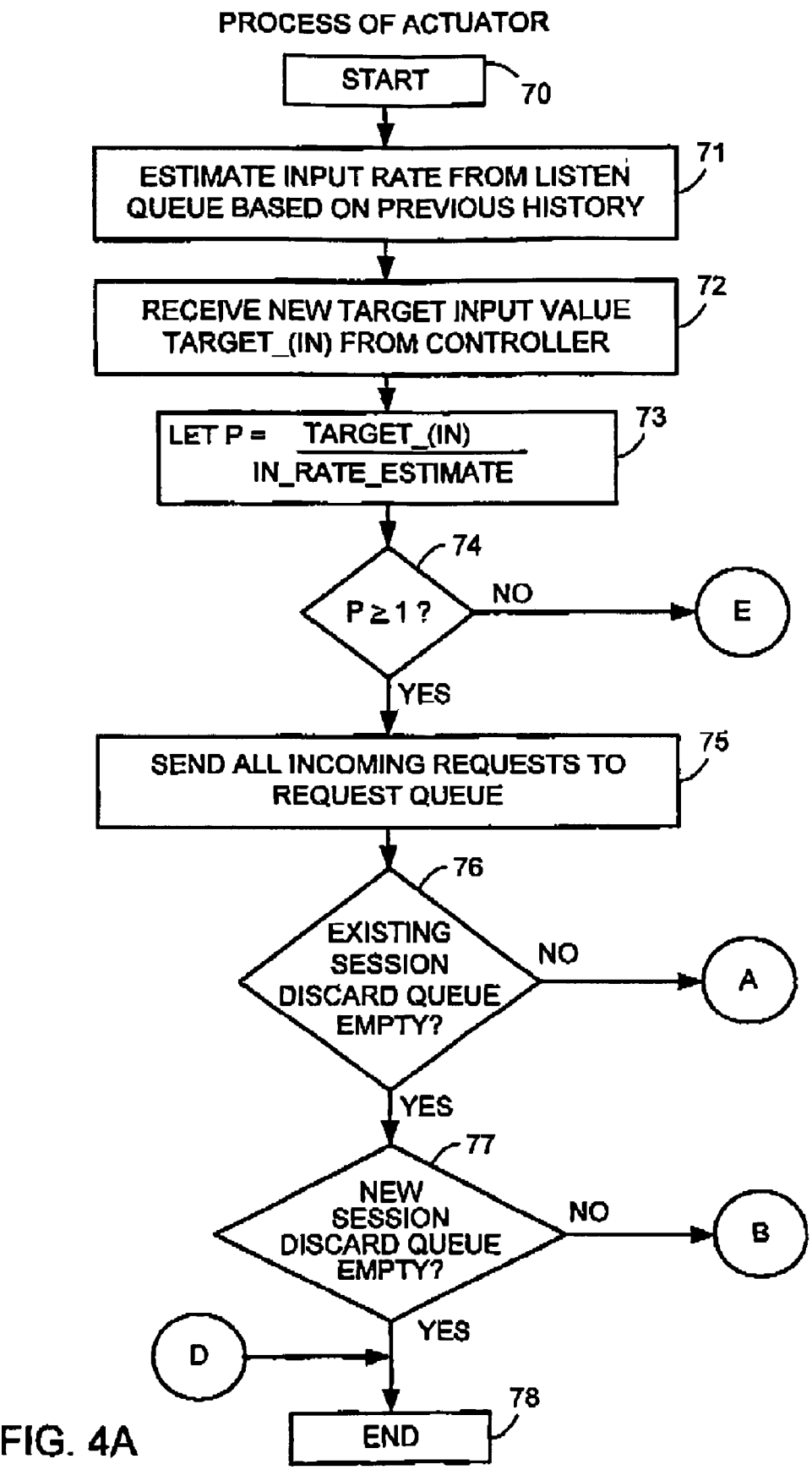
FIGS. 4A–4C show in a flowchart diagram form the process of the actuator of the adaptive admission control system of FIG. 3.
Figure 4B:
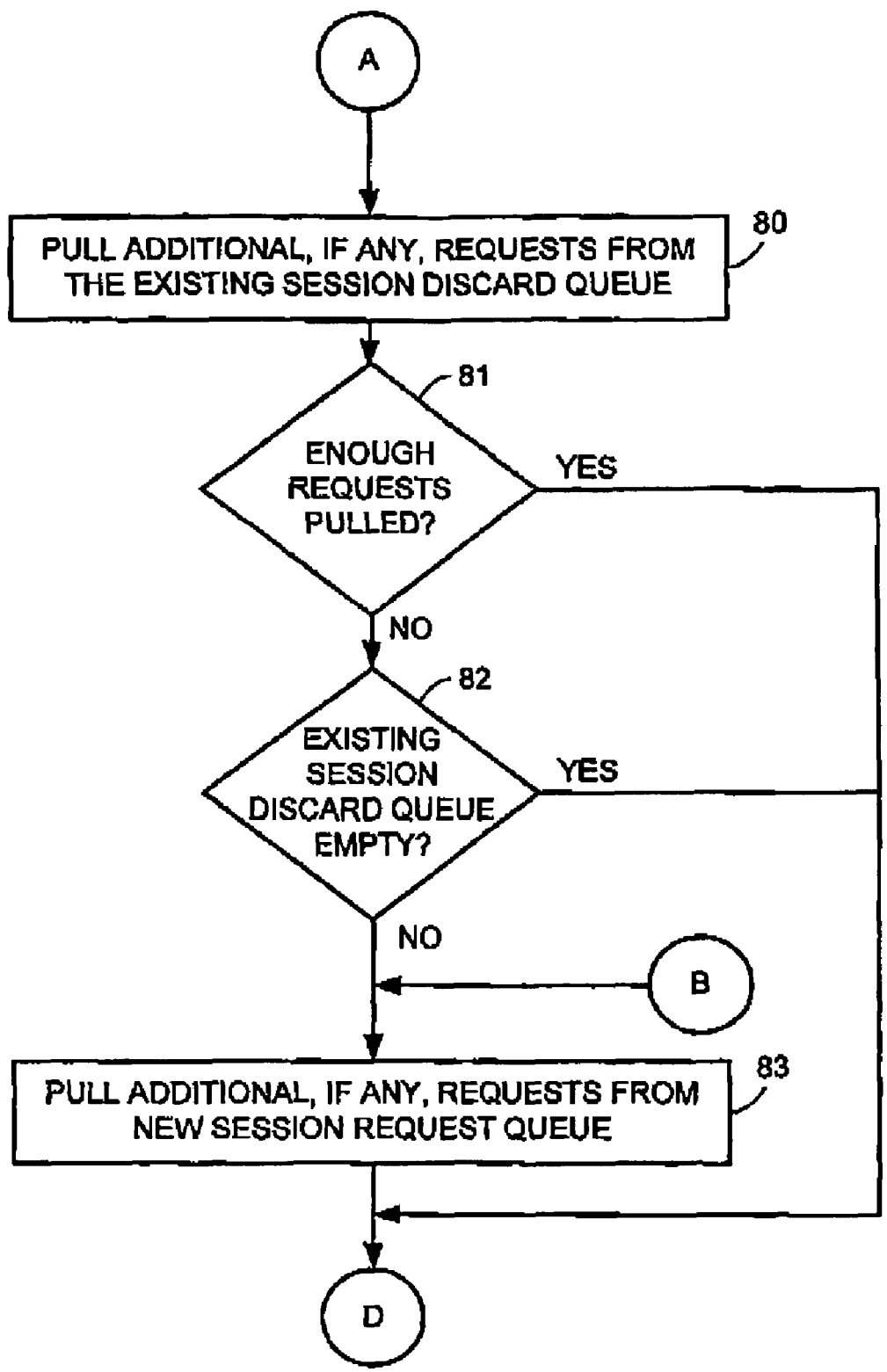
Figure 4C:
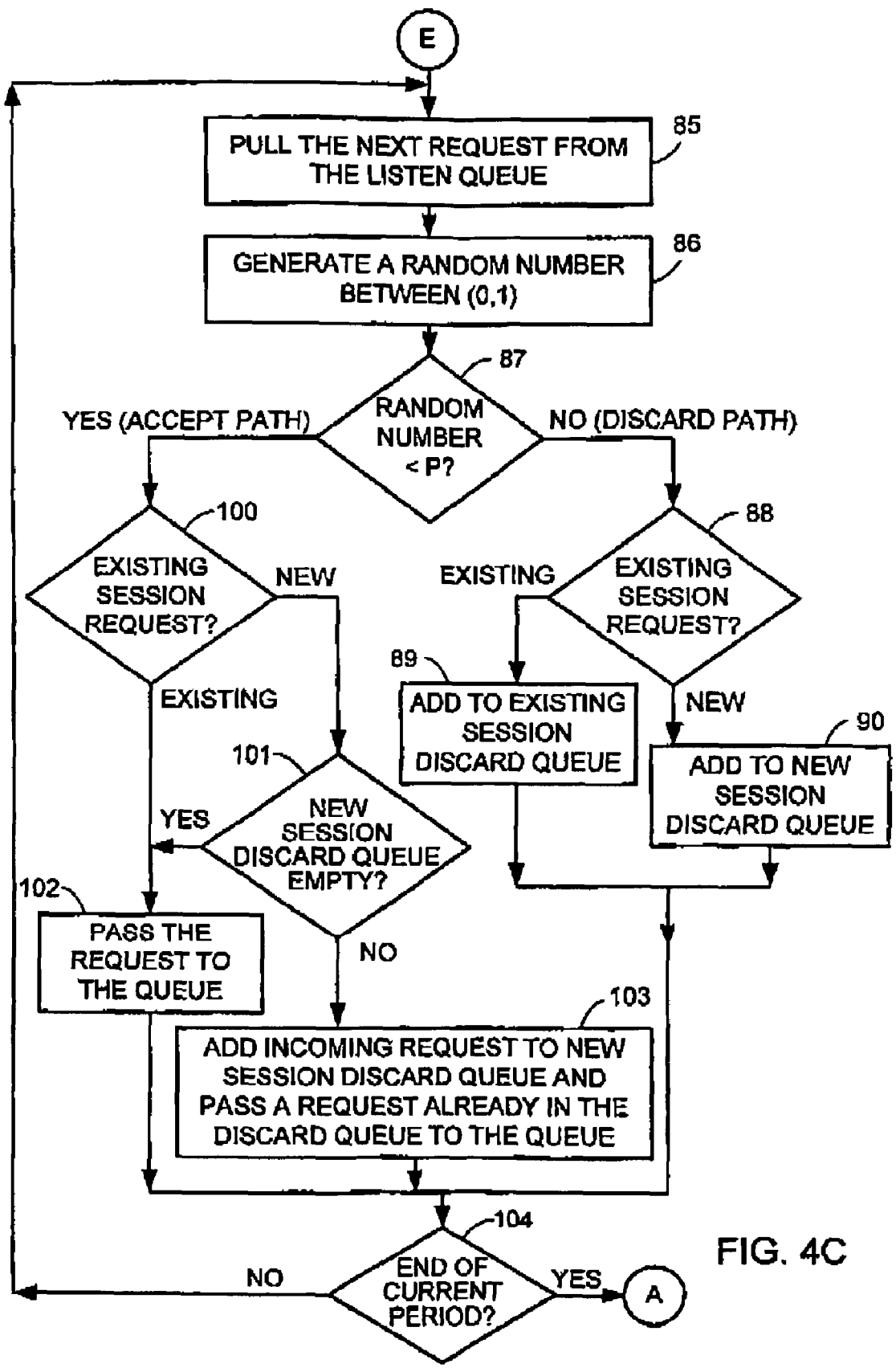

Referring to FIGS. 4A–4C, the operation of the actuator 52 is shown with respect to a particular processing cycle [t, t+T]. The process starts at the step 70. At the step 71, the actuator 52 estimates the number of requests to come in to the server application system 40 during the current processing cycle. This value, in_rate_estimate(t) can be determined based on past history. For example, the actuator 52 can use a simple weighted averaging scheme for this purpose.

At the step 72, the actuator 52 receives the target number Target_(in)(t) from the controller 54 for this processing cycle. Using this value and the Target_(in)(t) value, the actuator 52, at the step 73, computes the probability P with which an incoming request can be admitted for service to be:

$$P = (Target\_(in)(t) / in\_rate\_estimate(t)).$$

Then at the step 74, it is determined whether P is greater than or equal to the value of one (i.e., 1). This means that if the value P is greater than or equal to one, the actuator 52 is not expected to receive more incoming requests than the target number Target_(in). If so, the step 75 is the next step. If P is not greater than or equal to one, the process moves to the step 85 (see FIG. 4C).

At the step 75, the actuator 52 admits all incoming requests received during this processing cycle for service by the application logic module 44. The steps 76 and 77 are performed to determine which one of the discard queues 51a–51b contains requests. If the discard queue 51b contains requests, then the step 80 is performed. If the discard queue 51a contains requests, then the step 83 is performed.

At the step 80, additional requests are pulled by the actuator 52 from the discard queue 51b. At the step 81, it is determined whether the pulled requests are enough. If not, the step 82 is performed. If so, the processing cycle ends.

At the step 82, it is determined whether the discard queue 51b is empty or not. If so, the cycle ends. If not, the step 83 is performed, at which additional requests are pulled from the discard queue 51a. The cycle then ends.

When, at the step 74, it is determined that P is not equal to or greater than one, the actuator 52 has to deny service to some of the incoming requests. Based on the probability P, the actuator 52 determines whether it should service an incoming request or not. In order to ensure prioritization for requests belonging to existing sessions over requests for new sessions, the actuator does the following.

At the step 85, the actuator 52 pulls the next request from the external listen queue 42. At the step 86, the actuator 52 generates a random number between (0,1). At the step 87, the actuator 52 determines if the random number generated is less than P. If so, the received request goes through an accept path starting from the step 100. If not, the received request goes through a discard path starting from the step 88.

At the step 100, the actuator 52 determines if the request is an existing session request. If so, the request is passed to the request queue 53 at the step 102. If not (meaning the request is a new session request), the actuator 52 checks if there are any requests in the existing session discard queue 51b at the step 101. If so, the new session request is held back in the new session discard queue 51a at the step 103 and the actuator 52 admits one of the requests from the existing session discard queue 51b into the request queue 53. This gives priority to existing session requests over new session requests and treats existing session requests in a first-in-first-out (FIFO) manner.

At the step 88, the actuator 52 determines if the request belongs to an existing session. If so, the request is added to the existing session discard queue 51b at the step 89. If not, the request is added to the new session discard queue 51a at the step 90.

At the end of the current period, the actuator 52 checks if it has added at least Target_(in)(t) new requests for service. If this is not the case, the actuator 52 adds as many requests as possible from the existing session discard queue 51b until the number of requests added for service in this period equals Target_(in)(t). If the existing session discard queue 51b is empty and the number of requests added for service in this period is still less than Target_(in)(t), the actuator 52 adds requests from the new session discard queue 51a, until this queue is empty, or until Target_(in)(t) requests have been added for service in this period. The cycle then ends.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An adaptive admission control system for a server application system, comprising:
    a request queue that stores incoming requests before the incoming requests are serviced by the server application system;
    a discard queue that stores requests;
    an actuator coupled to the request queue and the discard queue to determine the input rate of the incoming requests during a processing cycle, and to send a target number of requests to the request queue and a remaining number of requests to the discard queue during the next processing cycle;
    a controller coupled to the actuator and the request queue to determine the target number based on the difference between actual and desired queue occupancy of the request queue.

2. The adaptive admission control system of claim 1, wherein the actuator sends the target number of requests to the request queue and the remaining number of requests to the discard queue during the next processing cycle if the input rate is greater than or equal to the target number of requests.

3. The adaptive admission control system of claim 2, wherein the actuator randomly determines which requests are to be sent to the request queue and which requests are to be sent to the discard queue so long as the total number of the requests sent to the request queue is equal to the target number.

4. The adaptive admission control system of claim 3, wherein the actuator determines if the incoming request is a new session request and sends an existing session request from the discard queue to the request queue when the discard queue contains the existing session request and sends the new session request to the discard queue.

5. The adaptive admission control system of claim 1, including a listen queue connected to the actuator and wherein the actuator sends the target number of requests from both the listen queue and the discard queue to the request queue if the input rate is less than the target number.

6. The adaptive admission control system of claim 5, wherein the actuator retrieves requests from the discard queue by first pulling requests from an existing session queue of the discard queue.

7. The adaptive admission control system of claim 1, wherein the discard queue further comprises an existing session request discard queue and a new session request discard queue.

8. The adaptive admission control system of claim 7, wherein the discard queue is cleaned up after every predetermined number of processing cycles.

9. A server application system, comprising:
    a server application module that performs predetermined server functions based on external requests from an external listen queue;
    an adaptive admission control system that controls admission to the server application module, wherein the adaptive admission control system further comprises
        a request queue that stores incoming requests before they are serviced by the server application system;
        a discard queue that stores requests;

an actuator coupled to the request queue, the discard queue, and the external listen queue to determine the input rate of incoming requests received from the external listen queue during a previous processing cycles, and to send a target number of requests to the request queue from the listen queue and the discard queue during the next processing cycle;

a controller coupled to the actuator and the queue to determine the target number based on the difference between actual and desired queue occupancy of the request queue.

10. The server application system of claim 9, wherein the actuator sends the target number of requests from the external listen queue to the request queue and the remaining request to the discard queue during the next processing cycle if the input rate is greater than or equal to the target number.

11. The server application system of claim 10, wherein the actuator randomly determines which requests are to be sent to the request queue and which requests are to be sent to the discard queue so long as the total number of the requests sent to the request queue is equal to the target number.

12. The server application system of claim 11, wherein the actuator determines if the incoming request is a new session request and sends an existing session request from the discard queue to the request queue when the discard queue contains the existing session request and sends the new session request to the discard queue.

13. The server application system of claim 9, wherein the actuator sends the target number of requests from both the external listen queue and the discard queue to the request queue if the input rate is less than the target number.

14. The server application system of claim 13, wherein the actuator retrieves requests from the discard queue by first pulling requests from an existing session queue of the discard queue.

15. The server application system of claim 9, wherein the discard queue further comprises an existing session request discard queue and a new session request discard queue.

16. The server application system of claim 15, wherein the discard queue is cleaned up after every predetermined number of processing cycles.

17. The server application system of claim 9, wherein the server application module is a TCP/IP-based server application.

18. The server application system of claim 9, wherein the server application module is a web server application.

* * * * *

UNITED STATES PATENT AND TRADEMARK OFFICE
CERTIFICATE OF CORRECTION

| | |
|---|---|
| PATENT NO. | : 7,197,564 B1 |
| APPLICATION NO. | : 09/545394 |
| DATED | : March 27, 2007 |
| INVENTOR(S) | : Preeti N. Bhoj et al. |

Page 1 of 1

It is certified that error appears in the above-identified patent and that said Letters Patent is hereby corrected as shown below:

In column 1, line 33, delete "severs" and insert -- servers --, therefor.

In column 4, line 44, delete "embedment," and insert -- embodiment, --, therefor.

In column 5, line 36, delete "sever" and insert -- server --, therefor.

In column 10, line 39, in Claim 4, delete "from-the" and insert -- from the --, therefor.

In column 11, line 15, in Claim 10, delete "request" and insert -- requests --, therefor.

Signed and Sealed this

Twenty-sixth Day of May, 2009

JOHN DOLL
*Acting Director of the United States Patent and Trademark Office*